Sept. 13, 1927. 1,642,662
H. C. BEHR
CENTRIFUGAL APPARATUS AND PROCESS FOR CONTINUOUSLY
SEPARATING LIQUIDS FROM SOLIDS
Filed May 6, 1925 7 Sheets-Sheet 4
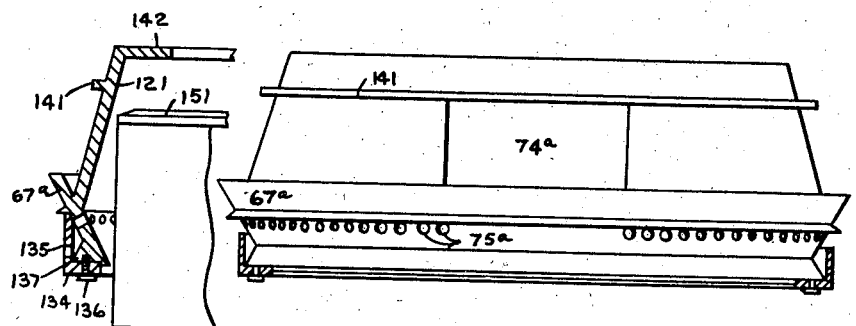
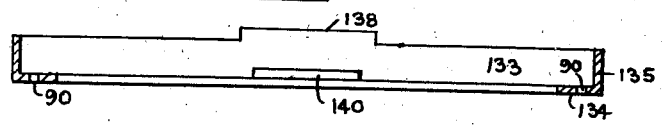
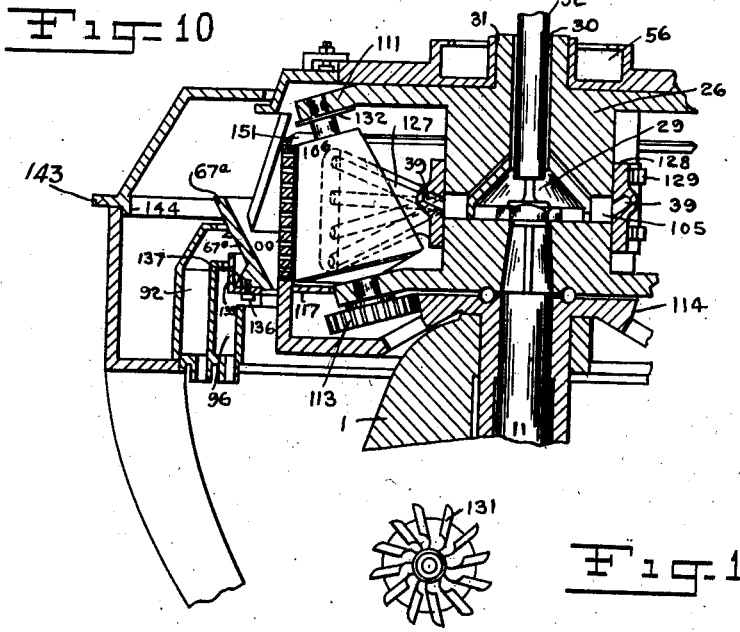
Inventor
Hans C. Behr
By his Attorney
S. J. Cox.

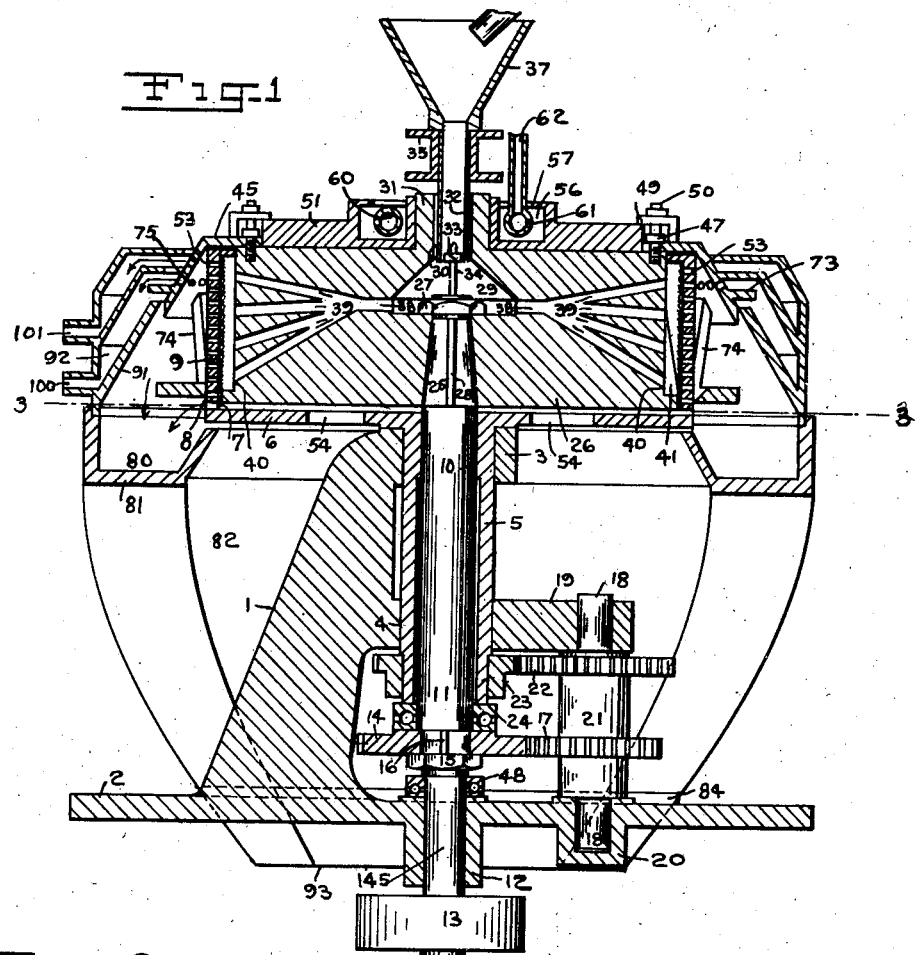
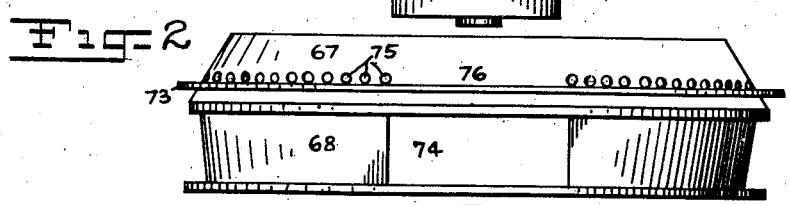
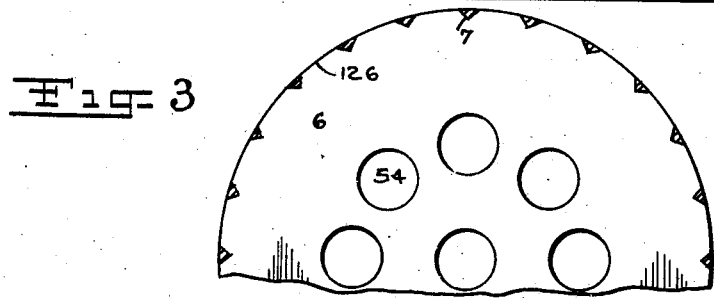

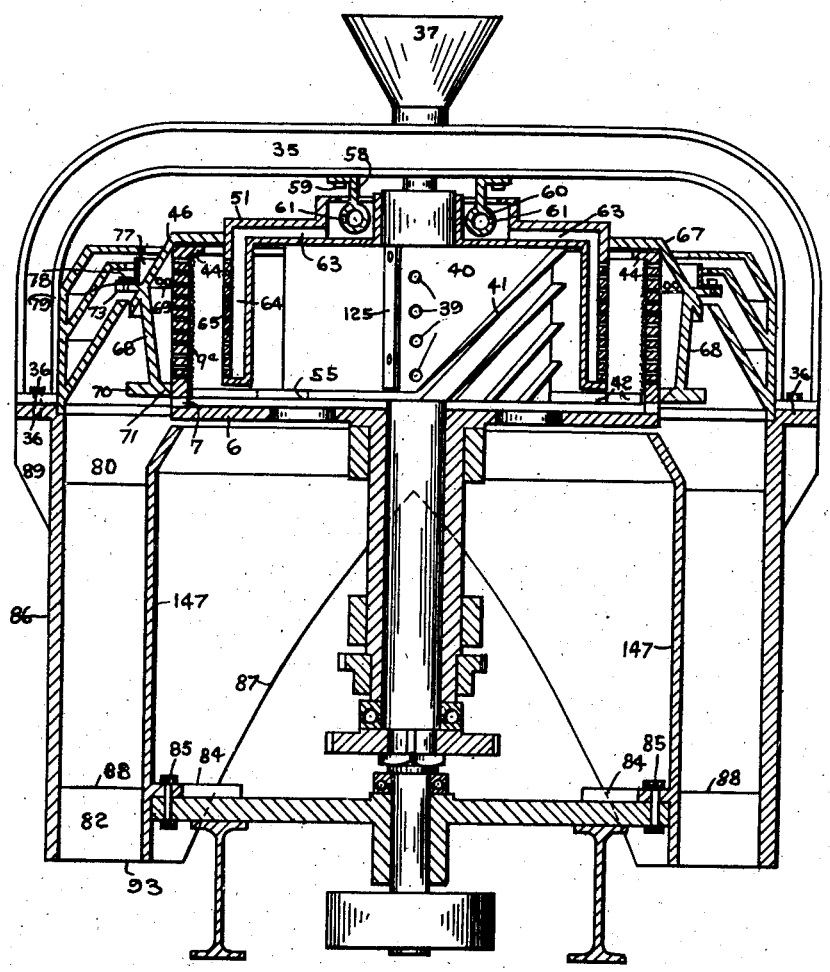

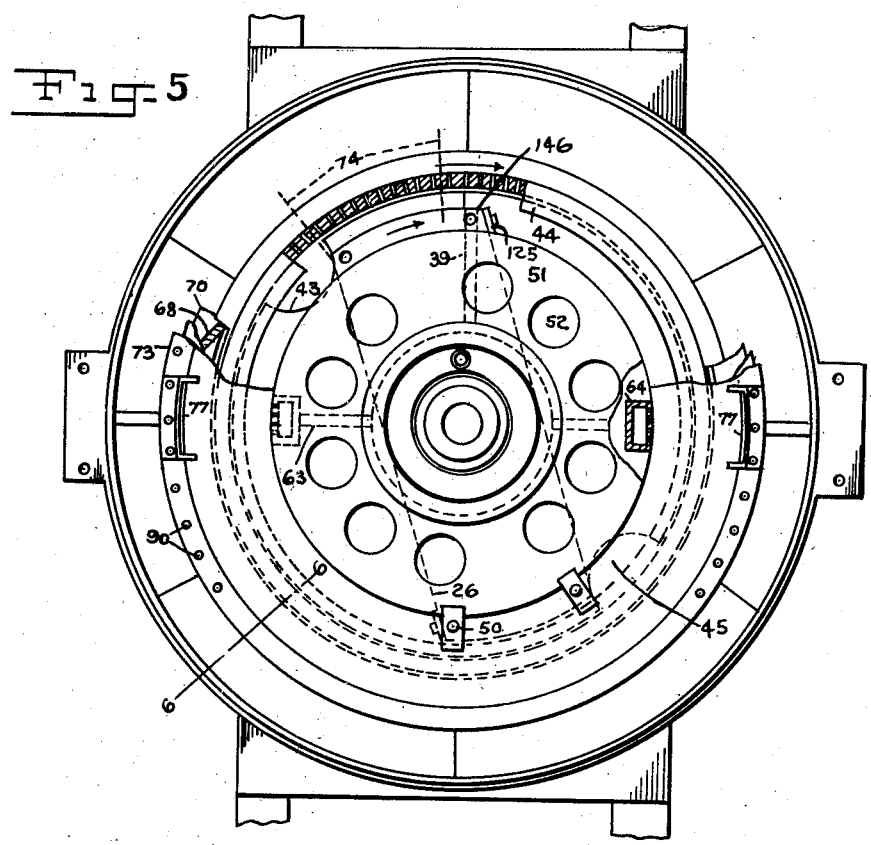
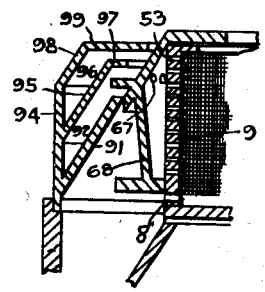

Sept. 13, 1927.

H. C. BEHR 1,642,662

CENTRIFUGAL APPARATUS AND PROCESS FOR CONTINUOUSLY
SEPARATING LIQUIDS FROM SOLIDS

Filed May 6, 1925

Inventor
Hans C. Behr
By his Attorney S. J. Cox

Patented Sept. 13, 1927.

1,642,662

UNITED STATES PATENT OFFICE.

HANS C. BEHR, OF SCARSDALE, NEW YORK.

CENTRIFUGAL APPARATUS AND PROCESS FOR CONTINUOUSLY SEPARATING LIQUIDS FROM SOLIDS.

Application filed May 6, 1925. Serial No. 28,323.

The invention relates to centrifugal machines and processes for separating liquids from a granular or other solid aggregate in a continuous manner.

In this process and apparatus the material to be separated is continuously deposited, while rapidly rotating, in a layer of moderate thickness on the likewise rapidly rotating inner surface of a foraminous cylinder or cone, and is allowed to remain in position on said surface a sufficiently long time to enable centrifugal force to expel the desired amount of pure liquor and discharge it into a receiver. A wash is then applied to eliminate the remaining liquor centrifugally in a diluted state, which is discharged into a separate receiver. Finally the dried solids are automatically conveyed off the screen and discharged over its edge by a mechanical plough, scraper or equivalent device. Each of these operations proceeds continuously while the material remains temporarily undisturbed on the screen by conveying devices.

The primary object of the invention is to effect the desired purity of the solids, which may be of a friable nature, without causing an undesirable amount of very fine solids to pass off through the screen with the eliminated liquor, as has been the case in continuous machines heretofore used, in which the material is in a state of continuous movement over the screening surface. Further objects are to save wear of screens, and generally to increase the efficiency of the entire machine.

Fig. 1 is a vertical medial section of a vertical axis machine according to my invention, showing the solids discharger arranged for discharge at the lower edge of the screen, and showing means for depositing material on the screen;

Fig. 2 is an elevation of the products distributing mantle showing the openings for the passage of fine solids into the main solids receiver, which may be forced through the screen during discharge by the discharger Fig. 3 is a plan and horizontal sectional view at line 3—3 of Fig. 1, showing the discharge openings for solids at the lower end of the basket;

Fig. 4 is an elevation and vertical medial section of the same machine parts shown in Fig. 1, the view being at right angles to Fig. 1, showing adjustable means for applying a wash to the deposited material;

Fig. 5 is a plan view of the machine shown in Fig. 1 and with part of the adjustable cover and mantle broken away to show the basket and internal parts beneath it;

Fig. 6 is a partial horizontal section and plan through line 6—6 of Fig. 5, being at a point where undiluted liquor is discharged through the screen;

Fig. 7 is a vertical section and elevation showing the arrangement for diverting the diluted liquor to a different discharge level from that for the pure liquor discharge, applying both to the machines shown in Fig. 10 and Fig. 15;

Fig. 8 is an elevation of the outer mantle for distributing the discharged separated materials to different levels;

Fig. 9 is a sectional view of the detail means employed in the machines shown in Figs. 10 and 15 for diverting the pure and diluted liquors to different levels;

Fig. 10 is a vertical section of a further modification of a machine with solids discharge at the upper edge of the basket, having planetary rotating solids dischargers of a conical form, which permit digging the dried solids out of a channel-like space;

Fig. 11 is a plan view of the cone shaped planetary rotary discharger shown in elevation in Fig. 10;

Figure 13:
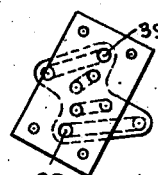
Fig. 13 is an end view of the distributor delivery end shown in Figs. 10 and 12.

Referring to the drawings, and particularly first to Fig. 1, 1 is a suitable frame on the base 2 carrying the rotating parts. The bearings 3 and 4 on said frame 1 have journaled in them the quill 5, integral with disk 6, connecting at its periphery through the short parts 7, Figs. 1, 4, 6 to the lower edge 8 of the foraminous basket 9. Journaled at 10 in the upper end of quill 5 is the shaft 11, the lower end 145 of which is journaled in the bearing 12, rigid with base 2. Shaft 11 is rotated by pulley 13 from any convenient source of power. Above bearing 12 gear 14 is rigidly fixed to shaft 11, secured by nut 15 and feather 16. Gear 14 meshes with gear 17 on shaft 18, mounted at its upper end in bearing 19, forming a continuation of bearing 4 and with its lower end in bearing 20, rigid with base 2. Gear 17, through hub 21, is rigid with gear 22, which meshes with gear 23, fixed on the lower end of quill 5. Thrust collar 24 serves to take axial thrust between the lower end of quill 5 and the upper side of gear 14, while thrust collar 48 carries the weight of all the rotating parts. The train of gearing 14, 17, 22, 23 is so proportioned, that quill 5 will rotate at a slightly greater rate than shaft 11 and in the same direction, this being a matter for mechanical construction and adjustment.

To the tapered top end 25 of shaft 11 is rigidly fixed the controller body 26. As here shown the controller consists of a rectangular block with its ends curved on a fixed radius and concentric with the basket 9, the rotation of which it follows at a slightly slower speed. Nut 27 and feather 28 secure controller 26 to end 25 of shaft 11. The upper central part of controller 26 contains the conical chamber 29, having at its upper small end the bore 30, extending through the boss 31. The stationary material feed pipe 32 extends through the opening 30 for delivering material to be treated to chamber 29. A small bladed impeller 33 is preferably arranged in the mouth of pipe 32 to cause the uniform peripheral discharge of material from the mouth of said pipe, and is conveniently mounted on a small extension 34 of shaft 11. Feed pipe 32 is secured in the frame 35, bolted at 36 to stationary parts of the machine as shown in Fig. 1. The upper end of pipe 32 may be formed as a funnel 37, as shown, or connected direct to a suitable delivery pipe from the source of material supply, if desired.

From two opposite points of the large lower end of chamber 29 there extend outward the two channels 38, branching out into a number of superimposed channels 39, which deliver the material out at the circular faces 40 of the controller body 26, Figs. 1 and 4. An adjustable leveling bar 125 is fixed to the edges 146 of controller 26.

On each of the circular faces 40 of controller block 26 there are fixed inclined blades or ploughs 41, Figs. 1 and 4, the edges of which clear the screen surface 9ª of basket 9. At the lower end of the uppermost blade of the group 41 adjoins the flange 42, Figs. 4 and 5, which serves to prevent semi-liquid deposited material from spreading downward beyond the limits of the screen surface in basket 9. Flange 42 is rigid with controller 26 and just clears the screen surface of basket 9. Below the blades 41 and for a short distance beyond, as at 43, Fig. 5, the disk is cut away to afford openings for the downward discharge of the dried material by the blades 41. As shown in Figs. 1 and 4, the basket 9 has at its upper edge an inner annular ledge 44, which prevents deposited semi-liquid material from escaping over the top edge of the basket 9. In the plan view Fig. 5 ledge 44 is partly broken away to show the discharge blade 41 beneath.

Centered on boss 31 and secured on top of controller 26 by clamps 49 and the upper extensions 50 of bolts 47 is the wash water distributing disk 51. Disk 51 has large openings 52, Fig. 5, for admitting air to the interior of basket 9, replenishing air expelled through the perforations 53 by the fan-like and centrifugal action of controller body 26. For the same purpose also holes 54 are provided in the disk 6, forming the base of basket 9, and holes 55 in flange 42 of the controller body 26. At the center of disk 51, surrounding the boss 31 is the raised circular channel 56, having an inner ledge 57 at its outer periphery. Suspended concentrically within said channel 56 by the angle lugs 58, secured by bolts 59 (Fig. 4) to the frame 35, is the tubular ring 60, which has numerous perforations 61 on its outer periphery and is provided with a supply connection 62 on its upper side.

From the annular channel 56, radial ducts 63 (Figs. 4 and 5) lead outward through disk 51, connecting at their outer ends with vertical chambers 64 extending from the under side of disk 51. The outer walls 65 of chambers 64 are foraminous and serve as a means for spraying the material deposited on the screen of basket 9. The point of application for such spray between deposition and discharge of material may be varied by adjusting disk 51 rotatively in relation to controller 26, which is done by loosening clamps 49.

The outer mantle 46 serves to distribute the solid and liquid products to their respective receivers and is rigidly connected to controller 26 at its inward flange 45 by the bolts 47. This mantle is composed mainly of two cones 67 and 68, joined at line 69. The upper cone 67 has a greater inclination than the lower cone 68 and extends somewhat beyond their junction at 69, having at that point also an outer circumferential reinforcing flange 73. The lower smaller end of cone 68 is open and with its inner lip 71 comes very close to the lower end of basket 9, where it is also reinforced on the outside by the integral ring 70. The lower cone 68 is cut away at two opposite places, where the solids are discharged by the blades 41, as shown at 74, Figs. 1 and 2. Just at line 69 and above the upper flange 73 the upper cone 67 has a circumferential row of holes 75 interrupted at two places, where the solids are discharged by blades 41 and where the openings 74 are located. The purpose of the cut out portion 74 in lower cone 68 is to permit the escape outward of any fine solid particles that may have been forced through the holes 53 in basket 9 by the action of the blades 41, and to thus prevent them accumulating inside mantle 46 and clogging the machine or eventually mixing with the expelled liquid products. The blank spaces at 76 in the row of holes 75 are also for the purpose of preventing such fine solid material from passing through said holes 75 into the liquid receivers described further on.

At the two opposite places where the diluted liquor comes through the holes 53 in basket 9, that is about opposite to where the wash water chambers 64 are located, there are bolted to flange 73 on cone 67 the diverting shields 77, by bolts 78 passing through the horizontal flange 79 of shield 77. The shield 77 diverts upward the diluted liquor coming through holes 75 and causes it to be discharged at a higher level and into a different receptacle from that for the pure liquor discharged through other holes at a lower level. Shield 77 may be somewhat inclined outward to facilitate discharge at its upper edge. A large number of bolt holes 90 are provided in flange 73 (Fig. 5) so that shields 77 may be adjusted and fixed in any suitable position corresponding with the point of application of the washing spray coming through the spray plate 65. A varied construction of means for this purpose will be described further on in connection with a modified form of my invention.

Surrounding the rotating outer mantle 46 is the group of stationary receivers for the three products made viz. that for the pure liquor, which is the first to be separated, that for the diluted liquor, which comes off next, and finally that for the solids, including the fines, which may come through the screen.

The solids receiver requiring the largest capacity, forms the basis of the receiver structure. It is annular in shape and formed with a short continuously cylindrical part 80 at the top, as shown in Figs. 1, 4 and 5, dividing below parts 81 into two branches 82, between which access is obtained to the gearing and bearings below the separator parts. The inner shell 147 has near its lower end flanges 84, secured by bolts 85 to base plate 2. The outer shell 86 is connected to the inner shell 147 by the inclined bottoms 87 and the ribs 88. At two opposite points near the top there are outer flanges 36 braced below by ribs 89 for carrying the feed supporting frame 35. The top of the solids receiver 80 is capped by the conical base 91 of the pure liquid receiver 92, the under side of which acts as a downward deflector for any solid fines coming through the screen of basket 9. The solids all drop out at the open bottom 93 (Figs. 1, 4 and 5).

The liquid receiver 92 is formed with the outer cylindrical wall 94 (Fig. 6) and the conical top 95, which latter forms the bottom of the diluted liquor receiver 96 and has an inner annular horizontal lip 97. The outer cylindrical wall of receiver 92 extends upward to form the outer wall of receiver 96, the cover of which is formed by the conical part 98 and flat part 99. The liquors gathered by receivers 92 and 96 escape respectively through the outlets 100 and 101 (Fig. 1).

The operation of the machine is as follows: Pulley 13 with shaft 11 being rotated by suitable power, the train of gears 14, 17, 22, 23, by the arrangement and proportions of its gears causes quill 5 to rotate in the same direction at a slightly greater speed, so that controller 26 with disk 51 and mantle 46, all rigid with shaft 11, rotate at a somewhat slower rate than basket 9, rigid with quill 5. Where more convenient, the driving power may also be applied through shaft 18 instead of through shaft 11, as shown. Assuming rotation in the direction of arrows in Fig. 5, it is obvious that the distribution controller 26 will rotate relatively to basket 9 at such slower rate as is fixed by the proportions of said train of gearing.

At the same time, material to be treated, being admitted into stationary feed tube 32, and passing down through the latter, is upon approaching its lower end brought into rapid rotation by the small bladed impeller 33, imparting centrifugal energy to the material and tending to equalize the outflow from the said tube, at the same time throwing it outward against the small upper end of the conical surface of chamber 29, where surface friction imparts further centrifugal energy to the material, causing it at the same time to flow towards the large bottom portion of said chamber. The conical surface of chamber 29, being aligned truly central to the axis of rotation, any peripheral inequality in the depth of material on the surface will be smoothed out hydrostatically by the material adjusting itself to equal depth in a way similar to material under the action of gravitation adjusting itself to a true level when in a liquid or semiliquid state. The material being thus equally distributed at the large end of chamber 29, its equal distribution to the two opposite ducts 38 is secured. In order to distribute the material to a number of points along the depth of basket 9, the ducts 38 subdivide into the number of smaller branches 39. To obtain a practically uniform thickness of deposit the upper or longer branches may require a somewhat larger calibre than lower or shorter branches, but the arrangement of the inner ends of the branch ducts as shown will usually accomplish this. The adjustable leveling plate 125, fixed to the distributor 26, serves to correct more localized differences in the thickness of the material.

Immediately upon reaching the foraminous surface of the screen the pure liquor will begin to separate and to pass outward through the openings 53 in basket 9, and, continuing its outward movement, will strike the inner conical surfaces of cones 67, and 68, being gathered thereby at the junction line 69 of said cones, and, escaping further outward through holes 75 in the form of a comparatively thin sheet, will strike the inner coned surface 95 of stationary receiver 92, where it will be collected and led away through outlet 100. It will be clear that, as the cones 67 and 68 rotate in phase with the pure liquor discharge, this discharge will always come on to the same sector of cones 67 and 68.

The position of the washing spray 65 having been fixed by the time required by the necessary degree of pure liquor elimination and the diverting shield 77 adjusted accordingly, the diluted liquor escaping through the screened surface of basket 9 is caught on the inner surfaces of cones 67 and 68, gathers at their junction line 69 and escapes through holes 75 in exactly the same manner as the pure liquor, only that it passes over a different and always the same sector of the cones 67 and 68, so that the pure and dilute liquors will never be contaminated by remnant films adhering to the inner surfaces of said cones. On issuing from holes 75 the diluted liquor is prevented from entering the pure liquor receiver 92 by diverting shield 77, with which said holes will register, which deflects the liquor upward, causing it to fly outward at a higher level than the pure liquor, as appears from Fig. 4, and landing against the inner surface of the conical top 98 of dilute liquor receiver 96, where it is collected and led off through outlet 101.

After application of the wash spray and a brief drying out phase, the solids left on the screen of basket 9 come within the range of the advancing edges 148 of the discharge blades 41, by which the said solids are scraped off the screen in a downward direction, so that centrifugal force can drive them outward through the spaces 126, (Fig. 3) between the short triangular posts 7 connecting basket 9 with bottom disk 6, and letting them fall out through the open bottoms 93, partly directly and partly sliding down over the spirally inclined bottoms 87.

There will nearly always be a smaller quantity of very fine stuff produced by the action of the discharger blades 41 on the solid material some of which will escape through the screen and holes 53 in basket 9, and as very little of such fines could escape through holes like 75 in the outer mantle 46, and would accumulate and clog the machine, as previously pointed out, the two opposite gaps 74 are provided in the lower and least inclined cone 68, which permit the passage through of said fine material, the upper cone 67 being of sufficient inclination to cause the said fines to shoot downward and to also escape outward through gaps 74 with the rest, so as to land against the inclined top 91 of the solids receiver 80 and to drop down together with the solids at the bottom of basket 9.

In Figs. 10, 11, 12 and 13 is shown a somewhat modified arrangement of the depositing ducts 39, and also a rotary discharger operating on a different plan from that shown in the other figures, also for a vertical machine but with discharge at the upper edge of the basket.

In this case the depositing ducts 39 are contained in two separate pieces 127 secured with flanges 128 by bolts 129 to the central body 26. Instead of a leveling plate on the trailing side of ducts 39, as in the cases illustrated by Figs. 4, and 5, which with some materials might cause fine solids to find their way through the screen, inclined flow plates 130 (Fig. 13) are bolted to the advancing side of the duct pieces 127, so as to take the impact of the jets of material issuing from ducts 39 and to cause said jets to spread out and flow off the edge of plate 130 on to the screen in a stream of practically uniform thickness. The arrangement with central conical chamber 29 and subsidiary chambers 105 is similar to that shown in Figs. 15, 16 and 17.

The discharger 106 is conical in form and is provided on its surface with straight scoops 131 (Fig. 11), which lie parallel and close to the screen-surface of the basket without touching it where the discharger is adjacent to it. Said scoops 131 are curved forward in the direction of their rotation, so that they dig up the material from the screen and retain such dug up material until it is removed by other agencies as will presently be made clear. The angle of cone 106, is so chosen, that the scoops 131 on the side farthest away from the screen will stand at sufficient inclination to permit centrifugal force to overcome the frictional resistance of the material on the metal surface of the scoops and drive the said material upward and outward over the top of cone 106 and over the upper edge of basket 9, as will be clear by reference to Fig. 10. The disk 132 prevents such discharging material from entering bearing 111. The manner of rotating cones 106 is similar to that of the conveyer system described in the following case and illustrated by Figs. 15, 16 and 17 except that the gears 113$^b$ and 114$^b$ must in the present case be of a bevel type to suit the inclination of the axes of cones 106.

An inwardly projecting ring 151 is fixed to the upper edge of basket 9 to prevent deposited semi-liquid material from flowing over the top of said basket. This arrangement would not be possible with a type of discharger, which moves the material laterally over the screen, like the conveyer 106$^a$ of Figs. 15 and 17, and the inclined plough blades 41, Figs. 4 and 5. The conical excavator 106 on the other hand is capable of digging the material out of the channel formed by ring 151 and the flange 117 at the lower edge of the screen on basket 9.

Figure 12:
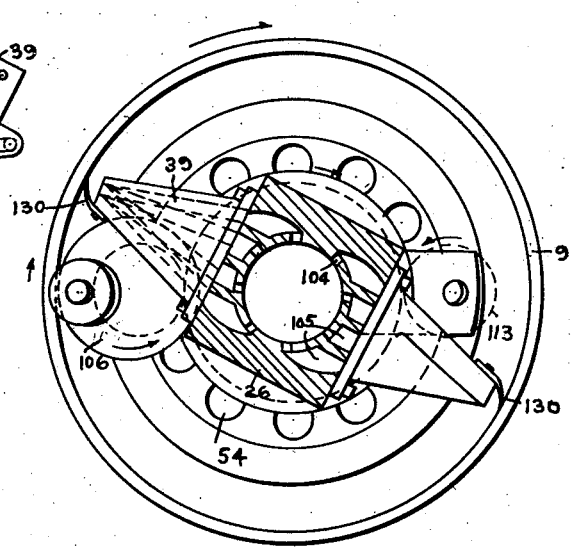
Fig. 12 is a plan view, partly in horizontal section, of the basket, material distributor and discharger shown in Fig. 10.
Figure 14:
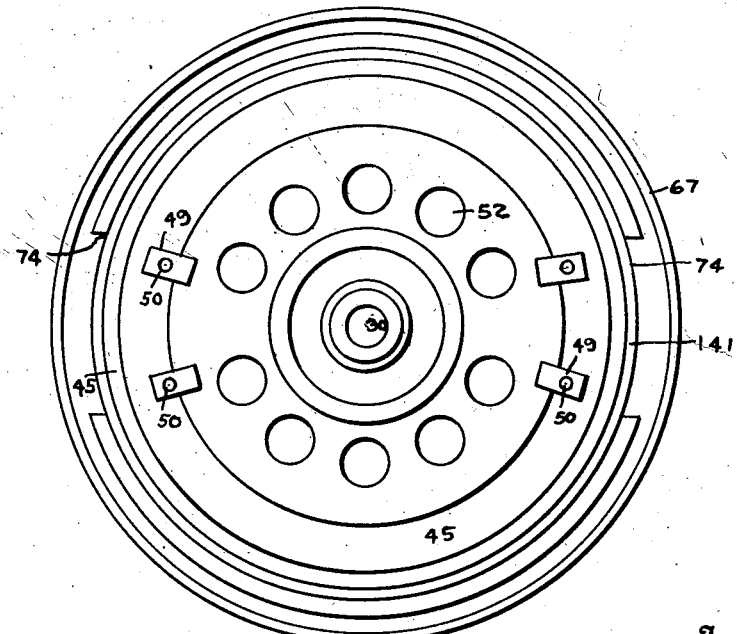
Fig. 14 is a plan view of the rotating parts of the machine shown in Fig. 10.
Figure 18:
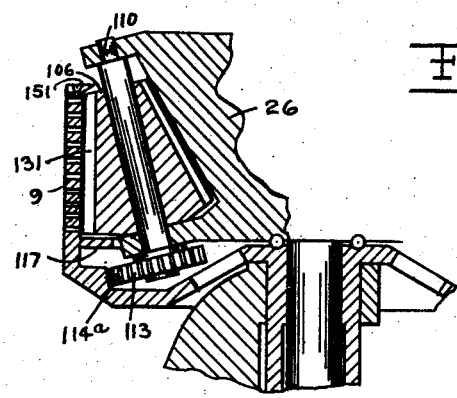
Fig. 18 is a vertical section of a modification of parts of the devices shown in Fig. 10.
Figure 19:
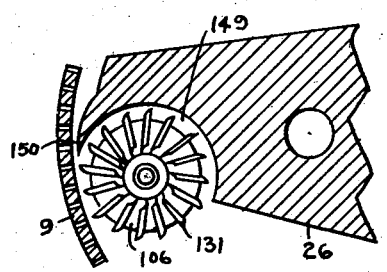
Fig. 19 is a plan of the parts shown in Fig. 18 partly in horizontal section.
Figure 20:
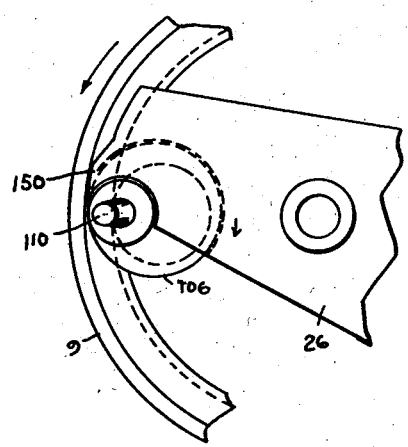
Fig. 20 is a plan view of the parts shown in Fig. 18.

Referring to Figs. 18, 19, 20 it is seen that the conical excavator 106 may also be adapted to operate in reverse rotation to that indicated in connection with Fig. 12. In order to obtain rotation in the direction indicated by arrow in Figs. 19 and 20, gear 114$^a$ is formed as an internal one and located outside of gears 113. The blades 131 on cone 106, are for such rotation less curved than those for the cone with opposite rotation shown in Fig. 10, and since they operate to move the material in opposite direction to that for Fig. 10 relatively to basket 9, there is provided in body 26 a pocket 149, closely surrounding cone 106 for about half its circumference, into which pocket the blades push the material they cut off from its advancing sheet. The edge 150 of the pocket 149 is pointed like a plough to facilitate its advance into the sheet of material. The blades 131 carry the excavated material around in pocket 149 until their inclination to the axis of the machine is greater than the angle of friction of the material on the cone surface, so that centrifugal force will drive the said material upward and outward over the top of the cone and the upper edge of the basket 9 in a manner similar to that described in connection with Figs. 10, 11, 12.

The various discharger means described in connection with Figs. 10 to 20 are all shown adapted to discharge at the upper edges of basket 9. It will be obvious, however, that they can also be arranged to discharge at its lower edge, like the plough discharger of the case illustrated by Figs. 1 to 5.

Figure 15:
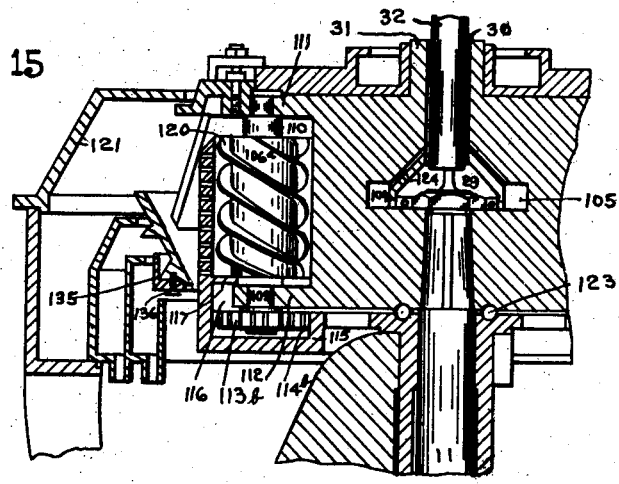
Fig. 15 is a view, nearly all in vertical section, of a modified form of the vertical axis machine, having a planetary rotating conveyer arranged for discharging the solids at the upper edge of the basket.
Figure 16:
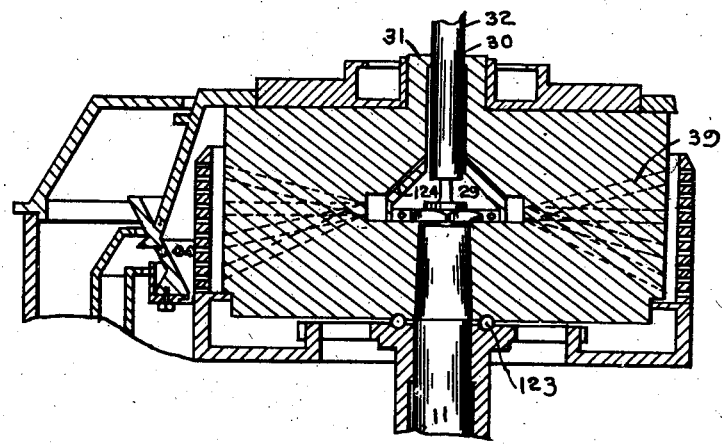
Fig. 16 is a different vertical section of the machine shown in Fig. 15, the section being through the material distributing device.
Figure 17:
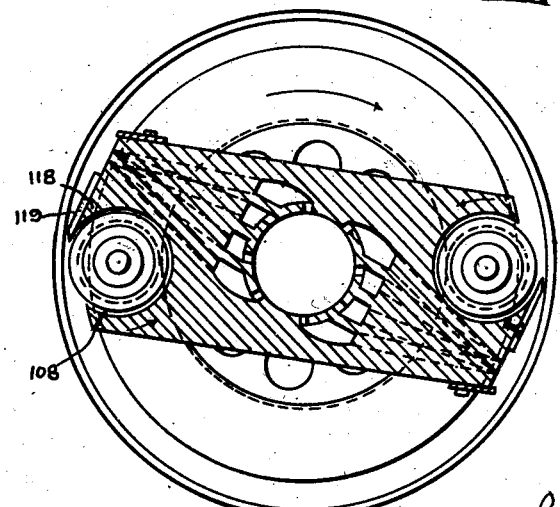
Fig. 17 is a plan view of the basket and interior parts of Fig. 15 partly in section.

Figs. 15, 16 and 17 show a modified vertical form of construction embodying my invention. The differences from the machine last described above are chiefly in the means for the discharge of the solids at the upper edge of the basket and involve modified mechanism for accomplishing this. There is also disclosed a method for ensuring that equal quantities of material are delivered at equidistant points along the depth of the basket.

As in Figs. 1 and 4 pipe 32 is leading through hole 30 into the small end of conical chamber 29. In this case the large end of cone 29 has as many equal sized outlets 104 as there are points of delivery onto the screen of basket 9; in the case illustrated there are eight altogether, and they must be equally spaced around the base of chamber 29 to secure equal discharge conditions. Outlets 104 lead each into a separate small subsidiary chamber 105 and these into ducts 39 of sufficient bore to insure that material discharged through outlets 104 will all immediately flow outward, so as not to obstruct the free and equal discharge from any one of the said outlets. Small ducts 124 lead into central opening 30 and serve to maintain equality of air pressure in all the chambers 105. The effect of the arrangement just described is obviously to deliver material at exactly equal rate through each duct 39 at its point of delivery onto the screen surface of basket 9.

As shown in Figs. 15 and 16, the solids are discharged by means of a rotating screw conveyer 106$^a$ in an upward direction, rotation being in the direction of the arrow, when rotation of the basket 9 and the slower rotation of the controller body 26 are as indicated respectively by the arrows. Conveyer 106$^a$ rotates closely but without contact in the cylindrical pocket 108 cut out of the controller body 26 and its trunnions 109 and 110 are carried in the end walls 111 and 112 of the said pocket. The lower trunnion extends downward beyond the bearing 112 and has fixed on its end a gear 113$^b$, which meshes into and is rotated by gear 114$^b$, formed in the central part 115 of the bottom of basket 9. The outer part of said bottom 6 is lower and forms an annular space 116, in which the gears 113$^b$ travel around while rotating about their axes. Just below the conveyer 106$^a$, and at the lower end of the foraminous part of basket 9, the latter has an inner annular flange 117 partially covering the annular space 116, which arrangement prevents any oil from rising up on to the screen surface and contaminating the material being treated. Flange 117 also acts to prevent any flow of deposited semi-liquid material down beyond the lower edge of the screen surface. To prevent deposited material, still in a semi-liquid state, from spilling over the top of basket 9 a thin disk, its edge almost touching the screen of said basket like disk 48 in Figs. 1, 4 and 5 may be fixed to the upper part of body 26 at the level of the top of the basket just as it is shown fixed to the lower part thereof in the said Figs. 1, 4 and 5.

The edge 118 of pocket 108, being that edge from which the outer exposed side of conveyer 106ª rotates away, has fixed to it a sharp metal plough 119, which conforms on the inside to the outline of the conveyer 106ª, where adjacent to it, while its edge just clears the screen surface in basket 9.

The operation of the discharging mechanism just described is as follows: Rotations being in the directions indicated by arrows, it is obvious that movement of the exposed outer side of conveyer 106ª, in relation to basket 9 is in the same direction as the relative rotation of controller body 26 is to basket 9. Hence the total movement relative to the surface of basket 9 of the conveyer spirals 120 is the sum of said relative movements. While the rotation of the spirals 120 lifts the solids, these are prevented from dropping off said blades by the enclosing cylindrical walls of pockets 108 and are thus rapidly advanced upward until they reach the upper end of the conveyer 106ª, which is about level with the upper edge of basket 9, and where they fly off outward against the conical cover 121 of the solids receiver 80. At the same time plough 119 prevents any of the solids, which pass through between the conveyer blades 120 from getting beyond the reach of the conveyer, since plough 119 directs them into pocket 108, where blades 120 lift them upward like those on the advancing side of the conveyer. The face of body 26 on the advancing side of the conveyer 106 clears the screen in basket 9 by at least the thickness of the layer of material.

The upward thrust due to the conveyers operation causes a downward force beside that due to gravity to act on controller body 26. The resulting total downward pressure, as shown in Figs. 15 and 16, is carried by the ball thrust bearing 123 between body 26 and the raised part 115 of the bottom of basket 9.

On account of the upward discharge of the solids the outer mantle 46, while similar for the conveyer discharger shown in Figs. 15, 16 and 17 and for the conical excavator shown in Figs. 10, 11 and 12, will differ from the construction required for the case with a downward discharge like that shown in Figs. 1, 4 and 5. Thus the upper cone 67 of Figs 1, 2, 4, 5, 6, becomes in effect the lower cone of Figs. 15, 16 and 17, and the lower cone 68 of the earlier figures becomes the upper cone in the latter. The means for effecting the discharge of the pure and of the diluted liquors at different levels is also different in the latter cases, being in the form of a continuous ring 133, shown separate in Fig. 9, and consisting of a horizontal flange 134, which is held by bolts 136 to the ridge 137 on the outside at the lower end of cone 67ª (Figs. 7, 8, 10, etc.) and an outer vertical part 135. The ring 134 may be of any height as long as it permits all of the pure liquor discharged through holes 75ª to pass over its top, as will be clear from inspection of the said figures. Opposite the holes 75ª, where dilute liquor is discharged, the ring 135 has an upward extension 138, the top edge of which is made to fit leak-tight against the circumferential ridge above holes 75ª in cone 67ª. Below said upward extension 138, and just above the flange 133, there is a slot 140 for the escape outward of the diluted liquor, diverted downward by the said local extension 138 of ring 135. Numerous bolt holes 90 are provided in flange 134, so that extension 138 and slot 140 may be adjusted circumferentially to suit the position of the washing spray applied inside basket 9, which is similar to that described in connection with Figs. 1 to 5. The outer flange 141 on cone 67ª serves to give reserve strength to compensate for the gap 74ª cut out of said cone below said flange 141.

While the solids receiver 80 of Figs. 7 et seq. forms the basis of the receiver structure, as in the case of Figs. 1 to 5, where the liquid receivers 92, 96 are imposed on top of it, the liquid receivers in the case of the later figures are entirely enclosed by the said solids receiver. The partly flat and partly conical cover 121, 142 rests with flange 143 on the outer cylindrical wall of solids receiver 80 and is centered thereon by spigot ring 144.

In all the cases described and illustrated the basket 9 is shown cylindrical. Obviously a conical basket may also be used with the system described, as might be desirable in some cases to aid the solids discharged by the slope of the screen surface.

While the foregoing description and drawings show the invention carried out only with centrifuges of the vertical axis type, it seems obvious, especially since discharge of the dried solids at the upper as well as at the lower edge of the basket is herein shown to be feasible, that the system and process are also applicable in the case of machines having a horizontal axis, or an inclined axis, if such were desirable. In these cases the only fundamental changes necessary would be in the design of the products receivers.

It will be clear from the foregoing description and the accompanying illustrations, that there is provided a process and apparatus for continuously separating liquids from a granular solid aggregate at a uniform rate by depositing continuously the material to be treated, while in rapid rotation, in a layer of moderate and practically uniform thickness within a foraminous cylinder or cone, rotating at a somewhat higher speed, the deposition of material taking place along a line extending across from one edge of the said foraminous surface to the other; that said deposited material is allowed to remain in position for a certain time while on said rotating foraminous surface, permitting centrifugal force to drive out the main part of the liquor in a pure state; that after a certain portion of the time, during which the said material is in position on the said rotating foraminous surface, it is automatically sprayed with a suitable liquid wash, which operates continuously, while material from which sufficient pure liquor has been driven off passes beneath it; that after the said spraying the material is automatically and continuously removed from said foraminous surface, while the latter remains in undiminished continuous rotation, by a means continuously rotating at a somewhat slower rate, and delivered by said means into a suitable solids receiver; that any fine solids coming through said foraminous surface at the stage of solids removal is prevented from mixing with the liquid products and conveniently diverted into the said solids receiver; that the escaping pure liquor does not come in contact with surfaces sprayed by diluted liquor, and that the escaping diluted liquor does not come in contact with surfaces sprayed by pure liquor, thus preventing dilution of the pure and enriching of the diluted; that apparatus in several detailed forms is herein disclosed suitable for carrying out the above operations.

What I claim is.

1. In an apparatus for continuously separating liquids and solids from a fluid containing both, a foraminous circular shell mounted to rotate continuously, a fluid distributing and regulating body within said shell also mounted to rotate continuously, but at a different rate of speed, both said members rotating on the same axis and having substantially concentric vertical inner and outer surfaces respectively, means carried by said body for receiving and distributing the fluid to its periphery and to the inner surface of said foraminous shell and depositing it continuously along the same, comprising a central fluid receiving chamber and conduits radiating therefrom, each of said conduits being divided into a plurality of smaller conduits extending therefrom on divergent lines to the periphery of said body.

2. In the apparatus as specified in claim 1 said branch conduit having their mouths arranged approximately from top to bottom of the opposite foraminous portion of the shell.

3. In the apparatus as specified in claim 1 said branch conduits constructed and arranged to cause an even flow of the fluid therefrom from top to bottom of the said foraminous shell.

4. In the apparatus as specified in claim 1, said branch conduits constructed and arranged to cause an even flow of the fluid therefrom from top to bottom of the said foraminous shell and to that end having their inner ends at different points in said body.

5. In an apparatus for continuously separating liquids and solids from a fluid containing both, a foraminous circular shell mounted to rotate continuously, a fluid distributing and regulating body within said shell also mounted to rotate continuously but at a different rate of speed, both said members rotating on the same axis and having substantially concentric vertical inner and outer surfaces respectively, means carried by said body for receiving and distributing the fluid to its periphery and to the inner surface of said foraminous shell and depositing it continuously along the same means carried by said body for conducting and applying a liquid washing spray to the material deposited on said shell, constructed and arranged to project liquid thereon automatically after the said material has been deposited on the shell, and means carried by said body for automatically removing said material from the shell.

6. In the apparatus specified in claim 5, means whereby all three of the said means carried by the body act through the rotation of the said body.

7. In an apparatus for continuously separating liquids and solids from a fluid containing both, a foraminous circular shell mounted to rotate continuously, a fluid distributing and regulating body within said shell also mounted to rotate continuously but at a different rate of speed, both said members rotating on the same axis and having substantially concentric vertical inner and outer surfaces respectively, means carried by said body for receiving and distributing the fluid to its periphery and to the inner surface of said foraminous shell and depositing it continuously along the same, means carried by said body for conducting and applying a liquid washing spray to the material deposited on said shell, constructed and arranged to project liquid thereon automatically after the said material has been deposited on the shell, said last named means comprising a separate conduit leading from the interior of the body to a point near the periphery thereof spaced circumferentially from the first named fluid distributing means.

8. In an apparatus for continuously separating liquids and solids from a fluid containing both, a foraminous circular shell mounted to rotate continuously, a fluid distributing and regulating body within said shell also mounted to rotate continuously but at a different rate of speed, both said members rotating on the same axis and having substantially concentric vertical inner and outer surfaces respectively, means carried by said body for receiving and distributing the fluid to its periphery and to the inner surface of said foraminous shell and depositing it continuously along the same, to form a layer covering an arc of said shell and means carried by said body and rotating therewith in proximity to the shell for continuously removing material from said layer and discharging it outward at one edge of said shell, said means comprising a blade substantially coextensive vertically with and diagonally disposed in respect of the vertical axis of the body and in fixed relation to said body.

9. In an apparatus for continuously separating liquids and solids from a fluid containing both, a foraminous circular shell mounted to rotate continuously, a fluid distributing and regulating body within said shell also mounted to rotate continuously but at a different rate of speed, both said members rotating on the same axis and having substantially concentric vertical inner and outer surfaces respectively, means carried by said body for receiving and distributing the fluid to its periphery and to the inner surface of said foraminous shell and depositing it continuously along the same, and a double conical mantle mounted exterior to said shell to rotate in phase with said body for receiving and carrying off liquid passing through said shell.

10. In the apparatus specified in claim 9, the said mantle having vertical openings outside the shell extending toward one edge thereof and horizontal annularly arranged openings above the said vertical openings.

11. In the apparatus specified in claim 9, the said mantle having vertical openings outside the shell extending to the lower part thereof and horizontal annularly arranged openings above the said vertical openings, said last named openings being non-coincident circumferentially with the vertical openings.

12. In a device of the character described, the combination of a rotary fluid distributing member, a foraminous separating member surrounding the periphery of the same and a receiving member outside said foraminous separating member, the said foraminous separating member being mounted to rotate at a different rate from the distributing member, and the receiving member mounted to rotate in phase therewith.

13. In the combination specified in claim 12, a distributor for washing liquid and a device for removing soilds from the separator both mounted on and rotating with the said distributing portion of said distributor but circumferentially spaced therefrom.

14. In a device of the character described, an annular screen, means for projecting a fluid containing matter to be separated against said screen and for causing it to pass therethrough, a collecting device outside said screen and arranged to receive and conduct in different directions at different sectors liquid passing through the former, said screen and collecting device rotating continuously in the same direction but at different speeds.

15. In a device of the character described, an annular screen, means for projecting a fluid containing matter to be separated against said screen and for causing it to pass therethrough, a collecting device outside said screen and arranged to receive and conduct liquid passing through the former, said screen and collecting device rotating continuously in the same direction but at different speeds.

16. In a device of the character described, an annular screen, means for projecting a fluid containing matter to be separated against said screen and for causing it to pass therethrough, a collecting device outside said screen and arranged to receive and conduct liquid passing through the former, said screen and collecting device rotating continuously in the same direction but at different speeds, said means for projecting fluid against the screen comprising a device inside the screen mounted to rotate therewith at a slightly different speed from the screen.

17. In combination with the devices specified in claim 16, a device for spraying and washing fluid on the screen after the first-named fluid has been projected thereon, mounted to rotate with the first-named fluid projecting means and to follow up the same, said collecting device having means opposite the said spraying means for diverting the washing fluid in a different direction from that in which the first-named fluid is directed.

18. In a device of the character described, a continuously rotating fluid distributing device, a washing fluid projecting device mounted to rotate therewith but spaced circumferentially therefrom and a scraping device also mounted to rotate therewith and spaced circumferentially therefrom, an annular screen surrounding said devices and having its inner surface radially spaced therefrom and opposed thereto, means for supplying washing fluid to said projecting device, and said projecting device having a conduit therein for conducting said fluid to its circumference, means for rotating said devices and screen in the same direction, the construction and arrangement being such that fluid is projected on and through said screen by the first device, matter collected on said screen is then washed by fluid from the second device, and the said matter is then removed therefrom by the scraping device while all of the said devices are rotating continuously in the same direction, a period of time elapsing between the said washing action and the said scraping action during which air is permitted to circulate along and through the said material to dry the same.

19. In the combination of devices specified in claim 18 means to rotate said screen at a speed slightly different from that of the other devices, whereby the said devices are caused to move along said screen at a relatively slow speed while all are rotating rapidly in the same direction.

20. In a device of the character described, the combination of an annular screen and a collecting and distributing device opposite, outside and spaced radially from the same, said devices being mounted to rotate continuously in the same direction but at slightly different speed, and means rotating therewith for distributing fluid continuously along the said screen and from top to bottom thereof.

21. The combination of a fluid distributor, a washing fluid projecting device and a scraping device and a screen surrounding the same, all rotating continuously and acting to project fluid on and through said screen, to wash matter collected on said screen from the said fluid and to remove such matter from the screen in a non-fluent form, and a collecting device also mounted to rotate therewith surrounding the screen and spaced therefrom, said collecting device having passages for material therein leading in different directions located opposite the devices for projecting fluid, washing and removing the separated material.

Witness my hand this 4th day of May, 1925, at the city of New York, borough of Manhattan, county and State of New York.

HANS C. BEHR.